United States Patent Office 3,187,002
Patented June 1, 1965

3,187,002
SUBSTITUTED 4-THIAZOLIDINONES AND PROCESS THEREFOR
Gerhard Satzinger, Memmingen, Allgau, Germany, assignor to Warner-Lambert Pharmaceutical Company, Morris Plains, N.J., a corporation of Delaware
No Drawing. Filed Mar. 6, 1961, Ser. No. 93,301
13 Claims. (Cl. 260—306.7)

The present invention relates to new and novel substituted 4-thiazolidinones of the formula:

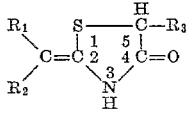

wherein $R_1$ is hydrogen, lower alkyl, aryl or $$-(CH_2)_n-R_4$$

in which $n$ is 1 to 3 and $R_4$ is di-lower alkylamino, aryl, or carbalkoxy in which the alkyl portion is lower alkyl; $R_2$ is cyano

in which $R_5$ is di-lower alkylamino, lower alkoxy or aryl, or $-SO_2-R_6$ in which $R_6$ is lower alkyl or aryl; and $R_3$ is hydrogen or lower alkyl. The present invention also relates to a method of preparing these substituted 4-thiazolidinones.

The terms "lower alkyl" and "lower alkoxy" as used in the specification and in the claims refer to branched and straight chain aliphatic groups having 1 to 6 carbon atoms.

The substituted 4-thiazolidinones of this invention have been found to have interesting pharmacological activity as analgesics, sedatives, anti-inflammatory agents and choleretic agents. In use, they may be formulated with conventional pharmaceutical carriers to form such typical dosage units as tablets, capsules, solutions, suspensions, suppositories and the like. These new and novel compounds are also valuable intermediates useful in the production of additional new and novel 4-thiazolidinones and bis(4-thiazolidinones) which in turn have interesting pharmacological activity.

For example, compounds of the above formula wherein $R_1$ is hydrogen, lower alkyl or aryl; $R_2$ is cyano,

in which $R_5$ is lower alkoxy or aryl, or $-SO_2-R_6$ in which $R_6$ is lower alkyl or aryl; and $R_3$ is hydrogen or lower alkyl, may be reacted in a basic medium with a compound of the formula $R_7-X$ wherein X is halogen and $R_7$ is lower alkyl, lower alkenyl, lower alkynyl, the acyl radical of a lower alkyl carboxylic acid, aryl or $(CH_2)_m-R_8$ in which $m$ is 1 to 3 and $R_8$ is halogen, hydroxyl, aryl, the acyl radical of a lower alkyl carboxylic acid, carbalkoxy in which the alkyl portion is lower alkyl or

in which $R_9$ is lower alkyl or when taken with the amino nitrogen atom forms a piperidino, morpholino or pyrrolidino group to form compounds of the formula:

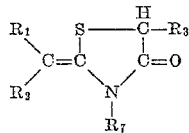

as described and claimed in my copending application Serial No. 93,318 filed March 6, 1961. The terms "lower alkenyl" and "lower alkynyl" as used hereinabove refer to branched or straight chain radicals having 2 to 6 carbon atoms and, respectively, a single double bond and a single triple bond.

In addition, the new and novel compounds of the present invention of the formula:

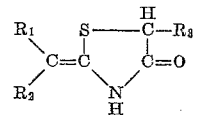

wherein $R_1$ is hydrogen, lower alkyl or aryl, $R_2$ is carbalkoxy in which the alkyl portion is lower alkyl and $R_3$ is hydrogen or lower alkyl, may be converted to substituted bis(4-thiazolidinones) of the formula:

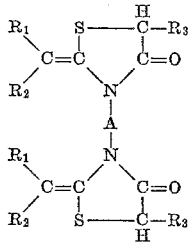

wherein A is an alkylene radical having 1 to 6 carbon atoms

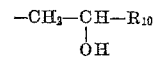

in which $R_{10}$ is an alkylene radical of 1 to 4 carbon atoms, or

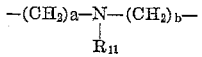

in which $a$ and $b$ are 1 to 3 and $R_{11}$ is a lower alkyl group, by reaction in a basic medium with one-half equivalent of compounds of the formula Y—B—Y or

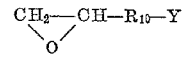

in which Y is halogen and B is an alkylene radical having 1 to 6 carbon atoms or a radical of the formula

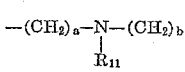

These substituted bis(4-thiazolidinones), which also have interesting pharmacological activity, are described and claimed in U.S. Patent 3,072,671, issued January 8, 1963.

It has now been found that the new and novel substituted 4-thiazolidinones of this invention of the formula:

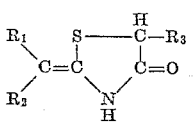

wherein $R_1$ is hydrogen, lower alkyl, aryl or $(CH_2)_n-R_4$ in which $n$ is 1 to 3 and $R_4$ is di-lower alkylamino, aryl, or carbalkoxy in which the alkyl portion is lower alkyl; $R_2$ is cyano,

in which $R_5$ is di-lower alkylamino, lower alkoxy or aryl, or $-SO_2-R_6$ in which $R_6$ is lower alkyl or aryl; and $R_3$ is hydrogen or lower alkyl, may be prepared by the following reaction:

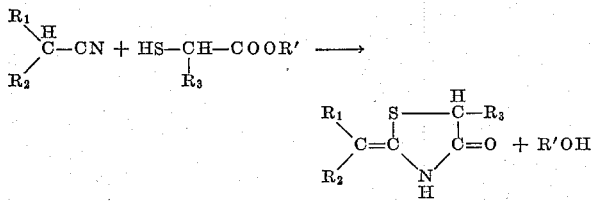

wherein $R_1$, $R_2$ and $R_3$ are as described above and $R'$ is a lower alkyl group.

The reaction of a nitrile of the formula

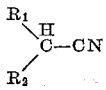

with an α-mercapto ester of the formula

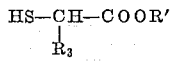

is carried out in a basic anhydrous medium comprising an aliphatic alcohol having 1 to 6 carbon atoms, for example ethanol, methanol, tert.-butanol and the like, in the presence of an alkali metal, for example sodium or potassium, or an amine such as piperidine. The reaction may be carried out at a temperature between 25° C. and the boiling point of the alcohol solvent used, with the reaction time normally being between about one-half hour and eight hours. Prior to the addition of the reactants to the reaction vessel, it is desirable that the vessel be freed of oxygen by flushing with an inert gas such as nitrogen.

The substituted 4-thiazolidinone separates as a precipitate of its alkali metal or amine salt which is then readily converted to the free acid by treatment with acid.

The following examples are included in order further to illustrate the present invention:

EXAMPLE 1

*2-cyanomethylene-4-thiazolidinone*

A mixture of 6.6 g. (0.1 mole) malonitrile and 12 g. (0.1 mole) ethyl mercaptoacetate is quickly dropped into a solution of 2.3 g. (0.1 mole) sodium in 150 ml. absolute ethanol under stirring. The apparatus is initially flushed with nitrogen. The separation of the sodium salt begins under strong evolution of heat. After an additional hour the precipitate is sucked off, washed with some cold absolute ethanol, then with ether and air-dried. Yield: 16 g. (quantitative) of colorless crystals, very soluble in water, constituting the sodium salt of 2-cyanomethylene-4-thiazolidinone. An aqueous solution of the sodium salt is strongly acidified. The precipitate is collected by filtration, washed with water, ethanol and ether and air-dried. Yield 14 g. (quantitative) of colorless needles from water, aqueous ethanol or dimethylformamide/water 1:1, melting point 187° C. dec., constituting 2-cyanomethylene-4-thiazolidinone.

*Analysis.*—Calcd.: C, 42.83; H, 2.88; N, 20.00; S, 22.85. Found: C, 42.93; H, 2.98; N, 20.44; S, 22.49.

EXAMPLE 2

*2-cyanomethylene-5-methyl-4-thiazolidinone*

A mixture of 6.6 g. (0.1 mole) malodinitrile and 12 g. (0.1 mole) methyl α-mercaptopropionate and 20 ml. absolute ethanol is quickly added to a solution of 4 g. (0.1 mole) potassium in 130 ml. absolute ethanol with stirring. The reaction proceeds under strong evolution of heat. Upon cooling to room temperature and standing for 10 minutes, the precipitated potassium salt of 2-cyanomethylene-5-methyl-4-thiazolidinone is recovered by filtration, washed with ethanol and ether and dissolved in water. The solution is acidified to pH 2 with HCl. The precipitate is collected by filtration, washed with water and ethanol and dried. Yield: 15 g. (quantitative) of 2-cyanomethylene-5-methyl-4-thiazolidinone, melting point 142–143° C., colorless crystals from aqueous ethanol.

*Analysis.*—Calc.: C, 46.73; H, 3.92; N, 18.17; S, 20.79. Found: C, 46.89; H, 3.83; N, 18.46; S, 20.38.

EXAMPLE 3

*2-(N,N-dimethylcarbamoylmethylene)-4-thiazolidinone*

A mixture of 11.2 g. (0.1 mole) N,N-dimethylcyanoacetamide and 12 g. (0.1 mole) ethyl mercaptoacetate is condensed with potassium ethylate as described in Example 2. The reaction mixture is refluxed for ½ hour. Upon cooling, the potassium salt is precipitated, recovered and acidified as described in Example 2. Yield: 9 g. (50%) of 2-(N,N-dimethylcarbamoylmethylene)-4-thiazolidinone, melting point 206–208° C. dec., light yellow crystals from 70% ethanol.

*Analysis.*—Calc.: C, 45.15; H, 5.42; N, 15.04; S, 17.22. Found: C, 45.38; H, 5.49; N, 15.06; S, 17.00.

EXAMPLE 4

*2-Benzoylmethylene-4-thiazolidinone*

A mixture of 15 g. (0.1 mole) cyanoacetophenone and 12 g. (0.1 mole) ethyl mercaptoacetate is condensed with potassium ethylate as described in Example 2. The reaction mixture is refluxed for 3 hours. The mixture is cooled and the potassium salt is recovered and acidified as described in Example 2. Yield: 15 g. (70%) of 2-benzoylmethylene-4-thiazolidinone, melting point 212–214° C., yellow crystals from acetic acid.

*Analysis.*—Calc.: C, 60.25; H, 4.14; N, 6.40; S, 14.62. Found: C, 60.12; H, 4.18; N, 6.38; S, 14.23.

EXAMPLE 5

*2-carbethoxymethylene-4-thiazolidinone*

A mixture of 11.3 g. (0.1 mole) ethyl cyanoacetate and 12 g. (0.1 mole) ethyl mercaptoacetate is condensed with sodium ethylate as described in Example 1. The reaction mixture is held at 60° C. for 1 hour and then cooled to room temperature, diluted with two volumes of water and acidified with HCl to pH 2. The precipitate is collected by filtration, washed with water and ethanol and dried. Yield: 18 g. (quantitative) of 2-carbethoxymethylene-4-thiazolidinone, melting point 145–147° C., colorless plates from aqueous ethanol.

*Analysis.*—Calc.: C, 44.90; H, 4.85; N, 7.48; S, 17.13. Found: C, 45.22; H, 5.13; N, 7.36; S, 17.18.

EXAMPLE 6

*2-carbethoxymethylene-5-methyl-4-thiazolidinone*

A mixture of 12 g. (0.1 mole) ethyl cyanoacetate and 12 g. (0.1 mole) methyl α-mercaptopropionate is condensed with sodium ethylate as described in Example 1. The reaction mixture is refluxed for 2 hours and is then processed as described in Example 5. Yield: 20 g. (quantitative) of 2-carbethoxymethylene-5-methyl-4-thiazolidinone, melting point 119° C., colorless crystals from water.

*Analysis.*—Calc.: C, 47.74; H, 5.51; N, 6.96; S, 15.93. Found: C, 47.51; H, 5.53; N, 7.01; S, 15.71.

EXAMPLE 7

*2-[(methylsulfonyl)methylene]-4-thiazolidinone*

A solution of 4 g. (0.1 mole) potassium and 12 g. (0.1 mole) ethyl mercaptoacetate in 150 ml. absolute ethanol is added rapidly to a solution of 12 g. (0.1 mole) methylsulfonylacetonitrile in 150 ml. ethanol. The mixture is maintained for 1 hour at room temperature. The precipitated potassium salt is recovered and acidified as described in Example 2. Yield: 12 g. (63%) of 2-[(methylsulfonyl)methylene]-4-thiazolidinone, melting point 163–164° C., light yellow crystals from water.

*Analysis.*—Calc.: C, 31.07; H, 3.66; N, 7.25; S, 33.19. Found: C, 31.01; H, 3.84; N, 7.31; S, 32.66.

EXAMPLE 8

*2-[(phenylsulfonyl)methylene]-4-thiazolidinone*

A mixture of 18.1 g. 0.1 mole) phenylsulfonylacetonitrile and 12 g. 0.1 mole) ethyl mercaptoacetate is reacted at room temperature for 2 hours in the presence of potassium ethylate as described in Example 7. The precipitated potassium salt is recovered and acidified as described in Example 2. Yield: 20 g. (80%) of 2-[(phenylsulfonyl)methylene]-4-thiazolidinone, melting point 127° C., light yellow crystals from chloroform.

*Analysis.*—Calc.: C, 47.04; H, 3.56; N, 5.49; S, 25.12. Found: C, 46.99; H, 3.56; N, 5.55; S, 24.67.

EXAMPLE 9

*2-[(phenylsulfonyl)methylene]-5-methyl-4-thiazolidinone*

A mixture of 18.1 g. (0.1 mole) phenylsulfonylacetonitrile and 12 g. (0.1 mole) methyl α-mercaptopropionate is reacted and the product recovered from the reaction mixture as described in Example 8 to yield 2-[(phenylsulfonyl)methylene]-5-methyl-4-thiazolidinone, melting point 143–145° C.

*Analysis.*—Calc.: C, 49.04; H, 4.12; N, 5.21; S, 23.81. Found: C, 49.16; H, 4.20; N, 5.18; S, 23.77.

EXAMPLE 10

*2-(1-carbethoxyethylidene)-4-thiazolidinone*

A mixture of 12.7 g. (0.1 mole) ethyl α-cyanopropionate and 12 g. (0.1 mole) ethyl mercaptoacetate is condensed with potassium ethylate as described in Example 2. The reaction mixture is refluxed for 1½ hours and is then allowed to stand overnight at room temperature. The precipitated potassium salt is recovered and acidified as described in Example 2. Yield: 10 g. (50%) of 2-(1-carbethoxyethylidene)-4-thiazolidinone, melting point 161–162° C., colorless crystals from methanol/dioxane 3:1.

*Analysis.*—Calc.: C, 47.74; H, 5.51; N, 6.96; S, 15.93. Found: C, 48.08; H, 5.47; N, 7.02; S, 15.45.

EXAMPLE 11

*2-(1-carbethoxyethylidene)-5-methyl-4-thiazolidinone*

A mixture of 12.7 g. (0.1 mole) ethyl α-cyanopropionate and 12 g. (0.1 mole) methyl α-mercaptopropionate is reacted and the product recovered as described in Example 10 to yield 2-(1-carbethoxyethylidene)-5-methyl-4-thiazolidinone, melting point 149–150° C.

*Analysis.*—Calc.: C, 50.20; H, 6.09; N, 6.51; S, 14.89. Found: C, 49.96; H, 5.99; N, 6.76; S, 14.64.

EXAMPLE 12

*2(1-carbethoxypropylidene)-4-thiazolidinone*

A mixture of 14 g. (0.1 mole) ethyl α-cyanobutyrate and 12 g. (0.1 mole) ethyl mercaptoacetate is condensed with potassium ethylate as described in Example 2. The reaction mixture is maintained at 80° C. for 5 hours and thereafter the ethanol is distilled off at reduced pressure. The residue is taken up in distilled water and acidified with HCl to pH 2. The precipitate is collected by filtration, washed with ethanol and water and dried. Yield: 11 g. (50%) of 2-(1-carbethoxypropylidene)-4-thiazolidinone, melting point 155–156° C., colorless crystals from 50% aqueous ethanol.

*Analysis.*—Calc.: C, 50.21; H, 6.09; N, 6.51; S, 14.90. Found: C, 50.51; H, 6.14; N, 6.58; S, 14.66.

EXAMPLE 13

*2-(1-carbethoxypropylidene)5-methyl-4-thiazolidinone*

A mixture of 14 g. (0.1 mole) ethyl α-cyanobutyrate and 12 g. (0.1 mole) methyl α-mercaptopropionate is reacted and the product recovered as described in Example 12 to yield 2-(1-carbethoxypropylidene)-5-methyl-4-thiazolidinone, melting point 148–149° C.

*Analysis.*—Calc.: C, 52.38; H, 6.59; N, 6.12; S, 13.99. Found: C, 52.20; H, 6.42; N, 6.30; S, 13.57.

EXAMPLE 14

*2-(1-carbethoxypentylidene)-4-thiazolidinone*

A mixture of 16.6 g. (0.1 mole) ethyl α-(n-butyl) cyano-acetate and 12 g. (0.1 mole) ethyl mercaptoacetate is condensed with potassium ethylate as described in Example 2. The reaction mixture is maintained at 80° C. for 3 hours. After cooling to room temperature, the solution is diluted with an equal volume of distilled water and acidified with HCl to pH 2. The precipitate is recovered by filtration, washed with ethanol and water and dried. Yield: 10 g. (42%) of 2-(1-carbethoxypentylidene)-4-thiazolidinone, melting point 138° C., light yellow needles from aqueous ethanol.

*Analysis.*—Calc.: C, 54.30; H, 7.04; N, 5.76; S, 13.18. Found: C, 54.24; H, 7.16; N, 5.46; S, 13.14.

EXAMPLE 15

*2-(1-carbethoxypentylidene)-5-methyl-4-thiazolidinone*

A mixture of 17 g. (0.1 mole) ethyl α-(n-butyl)cyano-acetate and 12 g. (0.1 mole) methyl α-mercaptopropionate is condensed with potassium ethylate as described in Example 2. The reaction mixture is refluxed for 1½ hours and is then cooled to room temperature. The precipitated potassium salt is recovered, acidified and the product purified as described in Example 2 to yield 15 g. (60%) of 2-(1-carbethoxypentylidene)-5-methyl-4-thiazolidinone, melting point 133–134° C., colorless crystals from aqueous ethanol.

*Analysis.*—Calc.: C, 56.01; H, 7.44; N, 5.44; S, 12.46. Found: C, 56.12; H, 7.47; N, 5.31; S, 12.25.

EXAMPLE 16

*2-(α-carbethoxybenzylidene)-4-thiazolidinone*

A mixture of 18 g. (0.1 mole) ethyl phenylcyanoacetate and 12 g. (0.1 mole) ethyl mercaptoacetate is condensed with potassium ethylate as described in Example 2. The reaction mixture is maintained at 80° C. for 4 hours and is thereafter cooled to room temperature. The precipitated potassium salt is recovered, acidified and the product purified as described in Example 2 to yield 18 g. (70%) of 2-(α-carbethoxybenzylidene)-4-thiazolidinone, melting point 125° C., colorless crystals from 80% aqueous methanol or benzene/petroleum ether.

*Analysis.*—Calc.: C, 59.30; H, 4.98; N, 5.33; S, 12.18. Found: C, 59.22; H, 5.15; N, 5.32; S, 11.74.

EXAMPLE 17

*2-(1-carbethoxy-3-diethylaminopropylidene)-4-thiazolidinone*

A mixture of 20 g. (0.1 mole) ethyl α-cyano-γ-diethylaminobutyrate and 12 g. (0.1 mole) ethyl mercaptoacetate is condensed with potassium ethylate as described in Example 2. The reaction time is 1 hour, under reflux. The mixture is cooled to room temperature and ether is added, whereupon the potassium salt precipitates from the mixture and is recovered by filtration. The solids are treated with 50 ml. 12% aqueous HCl. Upon cooling, the pure hydrochloride salt of 2-(1-carbethoxy-3-diethylaminopropylidene)-4-thiazolidinone precipitates. Melting point 209–210° C. dec., light yellow crystals from 90% ethanol.

*Analysis.*—Calc.: C, 48.36; H, 7.18; N, 8.67; S, 9.93; Cl, 10.98. Found: C, 48.40; H, 7.00; N, 8.70; S, 9.74; Cl, 10.87.

EXAMPLE 18

*2-(1-carbethoxy-3-dimethylaminopropylidene)-4-thiazolidinone*

Equimolar quantities of ethyl α-cyano-γ-dimethylaminobutyrate and ethyl mercaptoacetate are reacted and the reaction mixture treated as described in Example 17 to yield the pure hydrochloride salt of 2-(1-carbethoxy-3-dimethylaminopropylidene) - 4 - thiazolidinone, melting point 229° C. dec.

*Analysis.*—Calc.: C, 44.79; H, 6.49; N, 9.50; S, 10.87; Cl, 12.02. Found: C, 44.76; H, 6.53; N, 9.75; S, 10.66; Cl, 11.53.

EXAMPLE 19

*2-(1-carbethoxy-4-diethylaminobutylidene)-4-thiazolidinone*

Equimolar quantities of ethyl α-cyano-ω-diethylaminovalerate and ethyl mercaptoacetate are reacted and the reaction mixture treated as described in Example 17 to yield the pure hydrochloride salt of 2-(1-carbethoxy-4-diethylaminobutylidene)-4-thiazolidinone, melting point 191–193° C.

*Analysis.*—Calc.: C, 46.67; H, 6.85; N, 9.07; S, 10.38; Cl, 11.48. Found: C, 46.54; H, 6.76; N, 8.79; S, 9.81; Cl, 11.57.

EXAMPLE 20

*2-(1-carbethoxy-2-phenylethylidene)-4-thiazolidinone*

A mixture of 21 g. (0.1 mole) ethyl α-cyano-β-phenylpropionate and 12 g. (0.1 mole) ethyl mercaptoacetate is condensed with potassium ethylate as described in Example 2. The reaction mixture is refluxed for one-half hour and is cooled. The precipitated potassium salt is acidified and the product purified as described in Example 2 to yield 2-(1-carbethoxy-2-phenylethylidene)-4-thiazolidinone, melting point 155–156° C., yellow needles from ethanol/dioxane 4:1.

*Analysis.*—Calc.: C, 60.63; H, 5.45; N, 5.06; S, 11.55. Found: C, 60.89; H, 5.47; N, 5.16; S, 10.91.

EXAMPLE 21

*2-(1-carbethoxy-2-phenylethylidene)-5-methyl-4-thiazolidinone*

Equimolar quantities of ethyl α-cyano-β-phenylpropionate and methyl α-mercaptopropionate are reacted and the reaction mixture processed as described in Example 20 to yield 2-(1-carbethoxy-2-phenylethylidene)-5-methyl-4-thiazolidinone, melting point 137–139° C.

*Analysis.*—Calc.: C, 61.83; H, 5.88; N, 4.81; S, 11.01. Found: C, 61.95; H, 6.01; N, 4.89; S, 10.68.

EXAMPLE 22

*2-(1,2-dicarbethoxyethylidene)-4-thiazolidinone*

A mixture of 20 g. (0.1 mole) ethyl cyanosuccinate and 12 g. (0.1 mole) ethyl mercaptoacetate is condensed with potassium ethylate as described in Example 2. The reaction conditions are 1 hour at room temperature. The precipitated potassium salt is acidified and the product purified as described in Example 2 to yield 2-(1,2-dicarbethoxyethylidene)-4-thiazolidinone, melting point 98–100° C., colorless crystals from 40% aqueous ethanol.

*Analysis.*—Calc.: C, 48.34; H, 5.53; N, 5.13; S, 11.73. Found: C, 48.26; H, 5.83; N, 5.08; S, 11.71.

EXAMPLE 23

*2-(1,2-dicarbethoxyethylidene)-5-methyl-4-thiazolidinone*

Equimolar quantities of ethyl cyanosuccinate and methyl α-mercaptopropionate are reacted and the product recovered and purified as described in Example 22 to yield 2 - (1,2 - dicarbethoxyethylidene) - 5 - methyl - 4 - thiazolidinone, melting point 102–103° C.

*Analysis.*—Calc.: C, 50.17; H, 5.97; N, 4.87; S, 11.16. Found: C, 49.99; H, 5.94; N, 5.07; S, 11.16.

EXAMPLE 24

*2 - (1,3 - dicarbethoxypropylidene) - 4 - thiazolidinone*

A mixture of 21 g. (0.1 mole) ethyl α-cyanoglutarate and 12 g. (0.1 mole) ethyl mercaptoacetate is condensed with sodium ethylate as described in Example 1. The reaction mixture is refluxed for 1 hour and then cooled. Dilution with an equal volume of water results in the precipitation of the sodium salt which is acidified and the product purified as described in Example 1. Yield: 24 g. (80%) of 2 - (1,3 - dicarbethoxypropylidene) - 4 - thiazolidinone, melting point 122–123° C., colorless crystals from benzene/petroleum ether.

*Analysis.*—Calc.: C. 50.17; H, 5.96; N, 4.88; S, 11.16. Found: C, 50.17; H, 6.03; N, 4.96; S, 10.87.

EXAMPLE 25

*2 - (1,3 - dicarbethoxypropylidene) - 5 - methyl - 4 - thiazolidinone*

Equimolar quantities of ethyl α-cyanoglutarate and methyl α-mercaptopropionate are reacted and the product recovered and purified as described in Example 24 to yield 2 - (1,3 - dicarbethoxypropylidene) - 5 - methyl - 4-thiazolidinone, melting point 112–113° C.

*Analysis.*—Calc.: C, 51.80; H, 6.35; N, 4.65; S. 10.64. Found: C, 52.10; H, 6.27; N, 4.81; S, 10.28.

It is understood that the foregoing detailed description is given merely by way of illustration and that many variations may be made therein without departing from the spirit of my invention.

Having described my invention, what I desire to secure by Letters Patent is:

I claim:

1. A compound of the formula:

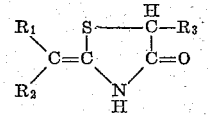

wherein $R_1$ is a member selected from the group consisting of hydrogen, lower alkyl, phenyl,

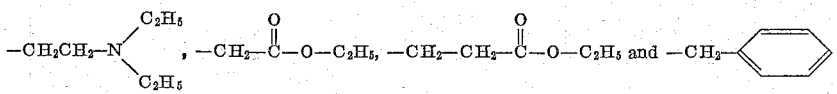

$R_2$ is a member selected from the group consisting of cyano,

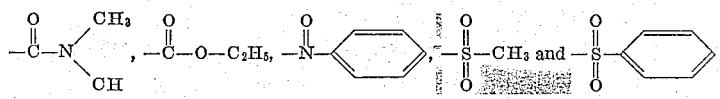

and $R_3$ is a member selected from the group consisting of hydrogen and lower alkyl.

2. 2 - cyanomethylene - 5 - methyl - 4 - thiazolidinone.
3. 2 - (N,N - dimethylcarbamoylmethylene) - 4 - thiazolidinone.
4. 2 - carbethoxymethylene - 5 - methyl - 4 - thiazolidinone.
5. 2 - [(methylsulfonyl)methylene] - 4 - thiazolidinone.
6. 2 - (1 - carbethoxypropylidene) - 4 - thiazolidinone.
7. 2 - (1 - carbethoxypentylidene) - 4 - thiazolidinone.
8. 2 - (1 - carbethoxy - 3 - diethylominapropylidene) - 4 - thiazolidinone.
9. 2 - (1 - carbethoxy - 4 - diethylaminobutylidene) - 4 - thiazolidinone.
10. 2 - (1,2 - dicarbethoxyethylidene) - 4 - thiazolidinone.
11. 2 - (1,3 - dicarbethoxypropylidene) - 5 - methyl - 4 - thiazolidinone.

12. A method of preparing a compound of the formula:

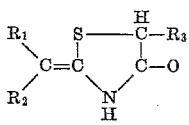

wherein $R_1$ is a member selected from the group consisting of hydrogen, lower alkyl, phenyl,

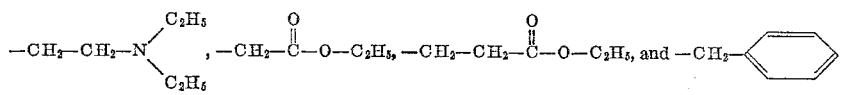

$R_2$ is a member selected from the group consisting of cyano,

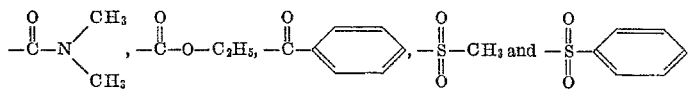

and $R_3$ is a member selected from the group consisting of hydrogen and lower alkyl, which comprises condensing under an oxygen-free amtosphere a nitrile of the formula

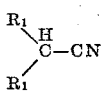

with an α-mercapto ester of the formula

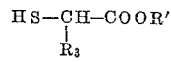

wherein R' is lower alkyl in an anhydrous reaction medium comprising a saturated aliphatic alcohol having 1 to 6 carbon atoms and an member selected from the group consisting of an alkali metal and an amine.

13. A method according to claim 12 wherein the reaction is carried out at a temperature between 25° C. and the boiling point temperature of said aliphatic alcohol for about one half to about eight hours.

References Cited by the Examiner

UNITED STATES PATENTS

| | | | |
|---|---|---|---|
| 2,617,808 | 11/52 | Schenck et al. | 260—306.7 |
| 2,865,924 | 12/58 | Asinger et al. | 260—306.7 |
| 2,957,869 | 10/60 | Strube | 260—240 |
| 2,993,891 | 7/61 | Zimmer | 260—240 |

FOREIGN PATENTS

| | | |
|---|---|---|
| 561,659 | 8/58 | Canada. |
| 641,882 | 8/50 | Great Britain. |
| 785,334 | 10/57 | Great Britain. |

OTHER REFERENCES

Pennington et al.: J. Am. Chem. Soc., vol. 75, pp. 109–114 (1965).

IRVING MARCUS, *Primary Examiner.*

WALTER A. MODANCE, *Examiner.*